United States Patent [19]

Hori et al.

[11] 4,389,096

[45] Jun. 21, 1983

[54] IMAGE DISPLAY APPARATUS OF LIQUID CRYSTAL VALVE PROJECTION TYPE

[75] Inventors: Yoshikazu Hori; Komei Asai, both of Hirakata; Masakazu Fukai, Nishinomiya, all of Japan

[73] Assignee: Matsushita Electric Industrial Co., Ltd., Osaka, Japan

[21] Appl. No.: 237,471

[22] Filed: Feb. 23, 1981

Related U.S. Application Data

[63] Continuation of Ser. No. 561, Dec. 26, 1978, abandoned.

[30] Foreign Application Priority Data

| Dec. 27, 1977 | [JP] | Japan | 52/157632 |
| Dec. 27, 1977 | [JP] | Japan | 52/157633 |
| Dec. 27, 1977 | [JP] | Japan | 52/157634 |
| Dec. 27, 1977 | [JP] | Japan | 52/157635 |
| Feb. 21, 1978 | [JP] | Japan | 53/19430 |
| Apr. 20, 1978 | [JP] | Japan | 53/47341 |

[51] Int. Cl.³ .................................... G02F 1/13
[52] U.S. Cl. ..................... 350/339 R; 350/162.17; 350/162.2; 350/336; 350/342; 350/348; 350/361; 356/406; 358/231; 358/237
[58] Field of Search ............... 350/331 R, 336, 339 R, 350/342, 348, 361, 162 SF, 162.17, 162.19, 162.2; 358/231, 232, 236, 237; 356/406

[56] References Cited

U.S. PATENT DOCUMENTS

| 2,892,380 | 6/1959 | Baumann et al. | 350/361 |
| 3,078,338 | 2/1963 | Glenn, Jr. | 356/406 X |
| 3,265,811 | 8/1966 | Ellis | 350/361 |
| 3,272,917 | 9/1966 | Good et al. | 350/361 X |
| 3,385,923 | 5/1968 | Vanderlaan et al. | 350/361 X |
| 3,450,461 | 6/1969 | Takayanagi | 350/361 |
| 3,470,310 | 9/1969 | Shashoua | 350/162 SF |
| 3,592,529 | 7/1971 | Juhlin, Jr. et al. | 350/361 X |
| 3,843,231 | 10/1974 | Borel et al. | 350/348 |
| 3,980,403 | 9/1976 | Pollack | 350/342 X |
| 4,037,927 | 7/1977 | Krueger | 350/336 |
| 4,060,316 | 11/1977 | Pollack et al. | 350/342 X |
| 4,150,876 | 4/1979 | Yevick | 350/342 X |

*Primary Examiner*—John K. Corbin
*Assistant Examiner*—Richard F. Gallivan
*Attorney, Agent, or Firm*—Stevens, Davis, Miller & Mosher

[57] ABSTRACT

A liquid crystal light valve projection type image display apparatus comprises an electro-optic element and a Schlieren optical system. The electro-optic element has a liquid crystal layer having a dielectric and optical anisotropy. An electric field having a spatial intensity distribution according to an image signal is applied to said liquid crystal at a spatial period, so that a spatially phase-modulated phase diffraction grating is formed in the liquid crystal layer. Thus, a projected image in enlarged form is obtained. The fact that the electric field with a spatial period is applied to the liquid crystal leads to a constant light diffraction angle, and the modulation of the diffraction light intensity in the applied electric field enables an image corresponding to the input image signal to be projected at high light utilization.

16 Claims, 17 Drawing Figures

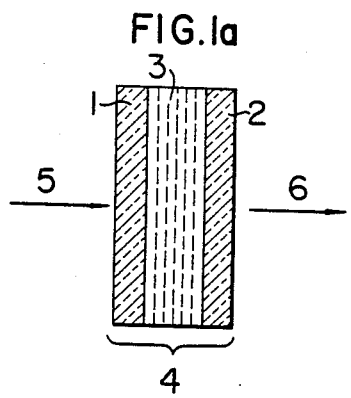
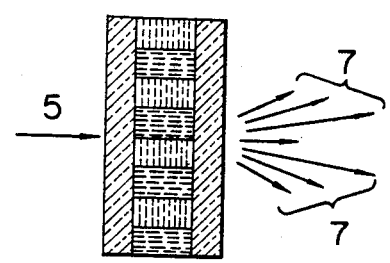
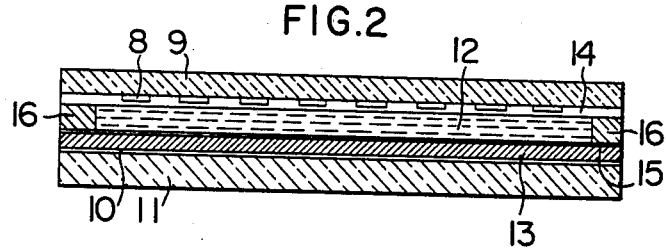
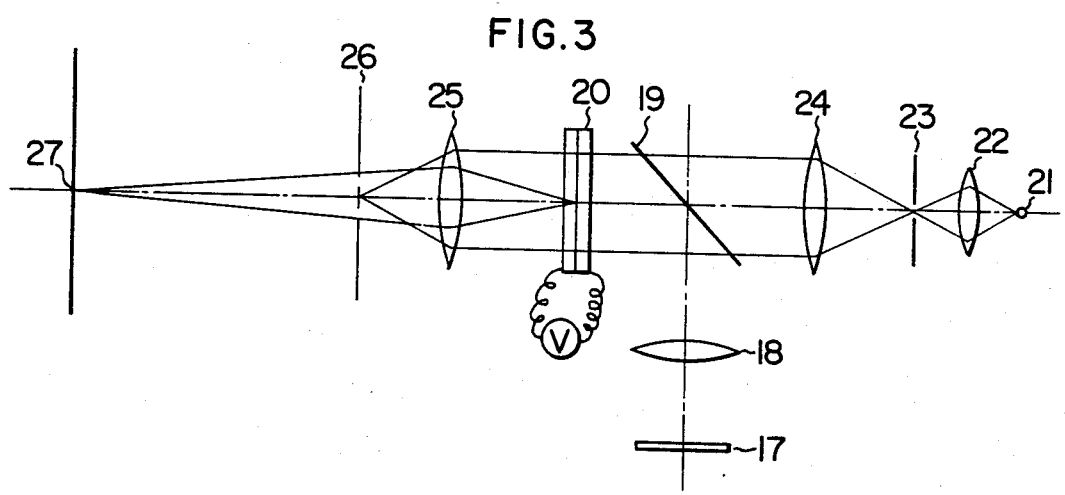
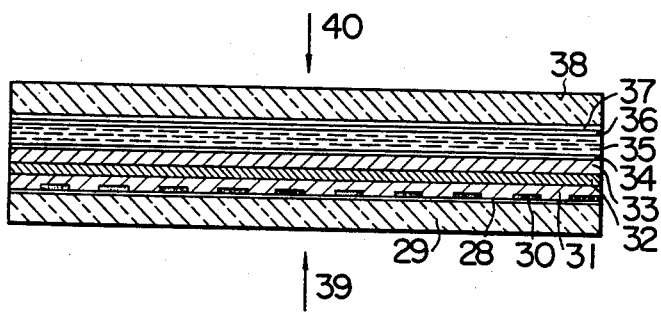

IMAGE DISPLAY APPARATUS OF LIQUID CRYSTAL VALVE PROJECTION TYPE

This is a continuation of application Ser. No. 000,561 filed Dec. 26, 1978 (now abandoned).

BACKGROUND OF THE INVENTION

1. Field of the Invention

This invention relates to a light valve image display apparatus of a projection type using a liquid crystal, and in particular to a liquid crystal light valve image display apparatus of a projection type which has a high projection light utilization factor and which is capable of realizing real-time display of a large color image of high quality with a single light valve.

2. Description of the Prior Art

In recent years, large size image display apparatus have been regarded as a promising product not only for the purposes of education and industry but also for large-sized home televisions. Great emphasis has been placed on the research and development of a projection type display apparatus comprising an optical projection system through which an image produced on a small screen is projected in an enlarged form on another screen. The research reports on a number of projection type image display systems and products have already been announced. Such systems in practical use include a system in which an image on a screen of a cathode ray tube is projected in an enlarged form on another screen through a lens system, and a system in which the surface of an oil film is roughened in accordance with the image by use of an electron beam so that an image is projected through a Shlieren optical system. These systems, however, have the problems of high cost and short lifetime. Another category of large-sized image projection apparatus for active research is a light valve projection system utilizing a PLZT, elastomer or liquid crystal, because of its expected high resolution and low cost. The liquid crystal, which is capable of modulating light at low voltage, is particularly interesting because it is comparatively easily driven and the device construction is simple. It is expected that the liquid crystal can realize a compact projection type image display apparatus at low cost.

Four main types of light valve using a liquid crystal have been proposed. In a first system, with an X-Y matrix arrangement of electrodes, an image is written in the liquid crystal layer with an electrical signal. A second type of system is such that an image is written by scanning an electron beam on a conductive substrate supporting the liquid crystal layer. In a third type of light valve utilizing liquid crystal, a laser beam is radiated on the liquid crystal layer and the resulting heat is used to cause local phase transition of the liquid crystal, thus writing an image. A fourth type of such a light valve comprises a photoconductive layer and a liquid crystal layer which are laid one on the other and arranged between electrode substrates, and an image is focussed on the photoconductive layer from a two-dimensional light source to supply an image signal in the liquid crystal layer by the use of the distribution of resistance variation in the photoconductive layer.

Applications of various phenomena and effects of the liquid crystal to the light valve are roughly divided into three types. They are a method utilizing light scattering phenomena such as DSM (dynamic scattering mode) and PT (phase transition), a method utilizing an electro-optic effect such as ECB (electrically controllable birefringence) or HFE (hybrid field effect), and a method utilizing light diffraction phenomena by the domain occuring in the liquid crystal such as WD (Williams Domain) or VGM (variable grating mode).

In the liquid crystal light valve projection system using light scattering, the light scattered from the liquid crystal is concentrated for image formation on a screen by use of a Schlieren optical system. Since light is scattered at wide angles, a large lens is required to condense it, and therefore it is rather difficult for this system to produce a bright image of high contrast for white-on-black display. The other disadvantages of this system include lack of sharpness of image edges, difficult display of half tones, resulting in the lack of image uniformity, and high driving voltage leading to a short lifetime.

The liquid crystal light valve projection system using the electro-optic effect has a number of advantages including a low voltage, long lifetime, high resolution, high contrast, multiple tones or gradation and quick response time. The shortcomings, however, are that in view of polarization type, the reproduced image is dark and it is not possible to produce a high-quality color display image due to an interference effect.

In the image projection system of liquid crystal light valve type using the light diffraction caused by domain in the liquid crystal layer, on the other hand, the diffracted light is projected on the screen by use of the Schlieren optical system. Since the diffracted light is clearly separated from non-diffracted light and the diffracted light does not spread widely from the optical axis, the light utilization efficiency is high on one hand and a bright and high-contrast image is produced on the other hand. Nevertheless, the Williams domain exists stably for only a small voltage range and therefore display of half tone is difficult. Further, it is low in response speed, and it is difficult to control the diffracted light in view of the fact that the domain pitch is determined by the thickness of the liquid crystal layer. Lastly, the light valve using VGM has a short lifetime due to the fact that the light valve is actuated with direct current.

SUMMARY OF THE INVENTION

Accordingly, it is an object of the present invention to provide an image projection system of liquid crystal light valve type with high brightness and quality which fundamentally uses light diffraction formed by a phase diffraction grating formed in a medium with its refractive index varying at a certain spatial period, in which the variation in the refractive index is electrically controlled to control the intensity of the diffracted light.

Another object of the present invention is to provide a system having the advantages of both the image display apparatus of the above-mentioned liquid crystal light valve projection type using the electro-optic effect and the conventional image display apparatus of liquid crystal light valve projection type using the light diffraction.

Still another object of the present invention is to provide a liquid crystal image display apparatus of light valve projection type having such a liquid crystal construction which produces an effective projected image by light diffraction, which is capable of color image display with a single light valve unlike conventional liquid crystal light valves.

According to the present invention, there is provided an image display apparatus of liquid crystal light valve projection type comprising two substrates, a nematic liquid crystal layer interposed between the substrates and having a dielectric anisotropy, the nematic liquid crystal layer being impressed to take electric field with a spatial interval or period having a spatial voltage field distribution corresponding to an input image signal, the substrates and the nematic liquid crystal making up an electro-optic element so constructed that a phase diffraction grating is formed in the liquid crystal layer; means for supplying the input image signal to the electro-optic element, and a Schlieren optical system for projecting the image information formed as the phase diffraction grating in the electro-optic element.

BRIEF DESCRIPTION OF THE DRAWINGS

FIGS. 1a and 1b are diagrams for explaining the principle of the system according to the present invention.

FIG. 2 shows a configuration of the liquid crystal light valve according to a first embodiment of the system of the present invention.

FIG. 3 is a diagram showing schematically the configuration of the projection system of the first embodiment shown in FIG. 2.

FIG. 4 is a diagram showing a configuration of the liquid crystal light valve according to a second embodiment of the system of the present invention.

DESCRIPTION OF THE PREFERRED EMBODIMENTS

Figure 5:
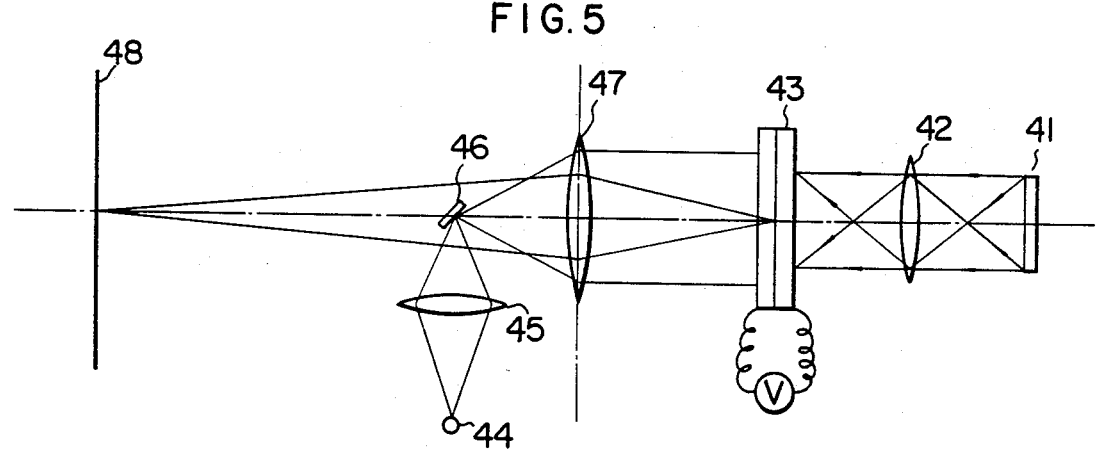
FIG. 5 shows schematically a configuration of the projection system of the second embodiment.

The principle of the present invention will be described. As shown in FIG. 1a, between a couple of transparent substrates 1 and 2, a nematic liquid crystal layer 3 having dielectric and optical anisotropy giving uniform orientation, thus making up a liquid crystal cell 4. The light 5 entering the liquid crystal cell 4 is transmitted through the cell 4 as transmitted light 6 without occurrence of diffraction. When a voltage exceeding a threshold value is applied to the cell 4 at a predetermined spatial period as shown in FIG. 1b, the angle of inclination of molecules in the liquid crystal 3 changes at this spatial period, so that optical characteristics such as the refractive index changes at its spatial period. Thus a diffraction grating is formed, with the result that the incident light 5 is transmitted as the diffracted light 7 diffracted at a specific angle determined by the spatial period. If the thickness and transmission factor of the liquid crystal layer 3 and the width of the electric field applied is constant, the intensity of the diffracted light is determined by the periodic variation of the refractive index, thus making it possible to control the intensity of the diffracted light by an external voltage applied at the spatial period.

With reference to a simple model as shown in FIG. 1b, the calculation of the intensity of the projection light shows that the projection light intensity is proportional to the value $$\sin^2 \frac{\pi}{2} \cdot \frac{\Delta n \cdot d}{\lambda},$$

where d is the thickness of the liquid crystal layer, λ the wavelength of incident light, π the circular constant, and Δn the variation in refractive index. This formula is quite the same as that representing the electro-optic effect of the liquid crystal layer. Therefore, by taking into consideration the material and orientation of the liquid crystal and the thickness of the liquid crystal layer, it is possible to realize electro-optic characteristics equivalent to those of the conventional liquid crystal light valve projection system using the electro-optic effect. The Williams domain and the variable grating mode occurred in the nematic liquid crystal layer having a negative dielectric anisotropy are also generated by the periodic change in the refractive index. The mode characteristics, however, sharply change with the construction of the liquid crystal cell, and the voltage range in which the domain is capable of being formed is limited. Therefore, it is difficult to control the diffracted light. This disadvantage is overcome by the present invention.

The image display apparatus of liquid crystal light valve projection type according to the present invention will be explained below with reference to embodiments.

Embodiment 1

A liquid crystal light valve applied to an embodiment of the present invention is schematically shown in FIG. 2. The feature of the electro-optic element of the present invention is that a transparent electrode 8 arranged at a predetermined spatial period or interval is used as the means for establishing a spatially periodic electric field in the liquid crystal layer 12 and that when a voltage is applied to the liquid crystal layer 12 through a photoconductor layer 13 there is established in the liquid crystal a spatial intensity distribution of electric field corresponding to input image signals. More specifically, the electro-optic element under consideration comprises glass substrates 9 and 11. The glass substrate 9 covers a transparent stripe electrode 8 arranged at a pitch of 24 μm and having about 12 μm in width and an oxide film 14 which causes the liquid crystal to align in a particular orientation. The glass substrate 11 covers the transparent electrode 10, a ZnS photoconductor layer 13 about 1 μm thick and an oxide film 15. Between the substrates 9 and 11, the homogeneously oriented positive biphenyl liquid crystal layer 12 is held to the thickness of approximately 2 μm by the spacers 16. In this case, the photoconductor layer 13 has a spectral sensitivity in the range of ultraviolet ray wavelength.

An optical system used for image writing and projection in the embodiment under consideration is shown schematically in FIG. 3. A writing input signal source is comprised of a two-dimensional optical image 17 emitting an ultraviolet ray. By use of a writing lens 18 and a dichroic mirror 19 for reflecting the ultraviolet ray and transmitting visible light, a two-dimensional image is focussed on the ZnS photoconductor layer of the liquid crystal light valve 20. Projection is effected by the Schlieren optical system. In other words, the light emitted from the light source 21 is focussed at the input slit 23 by the condenser lens 22. The light that has passed the slit 23 and expanded becomes parallel through the Schlieren lens 24, and after passing the dichroic mirror 19, enters the light valve 20. In the case where a diffraction grating is not formed in the liquid crystal layer of the light valve 20, the incident light passes through the liquid crystal layer without being diffracted as explained with reference to FIG. 1a. The light, therefore, is completely shut off at the Schlieren stop 26 placed at the focal point of the projection lens 25. When an ultraviolet ray light image is focussed on the surface of the photoconductive layer of the light valve 20 and a voltage is applied between the electrodes of the light valve 20, on the other hand, a phase diffraction grating is formed corresponding to the writing input image. Then the incident light is diffracted, and the light diffracted by the liquid crystal layer is not blocked at the Schlieren stop 26 but forms an image on the screen 27 through the projection lens 25. In this way, an image corresponding to the input image is projected on the screen 27. The image projection characteristics of this liquid crystal light valve are such that with the ultraviolet writing light ray of about 2 mW/cm$^2$ and applied voltage of DC 5 V, the resolution is 30 lines per mm or more, gray scale 7 steps and response time about 10 ms, which are satisfactory for projection of even a television image. This is the embodiment wherein one of the electrodes on one of the substrates is constructed to have stripe type electrode structure arranged at a predetermined spatial period. Instead of this construction, it is obvious that the present invention may be constructed with the same effect in such a manner that an electric field is applied to the liquid crystal layer through a high resistance layer of periodical shape on the electrode attached over the whole surface of the substrate. Also, although the projection system of light writing type is employed in this embodiment, a multiplex driving system or a system which drives the liquid crystal by providing a switching element such as TFT or MOS for each picture element may be employed together with means for applying the periodic electric field such as the electrode of a spatial period structure provided on the other substrate as mentioned above, for the purpose of image projection.

Embodiment 2

A reflection liquid crystal light valve of two dimensional light image writing type according to a second embodiment is shown schematically in FIG. 4. A metal screen bar grating 30 having the width of 12 μm and pitch of 24 μm is formed on the transparent electrode 28 of the glass substrate 29. The electrode 28 is covered with a CdS photoconductive layer 31 of high resistance of about 10$^9$ Ω-cm and about 5 μm thick, which in turn is covered with a reflector 33 made of a CdTe light blocking layer 32 about 2 μm thick and a multi-layer of TiO$_2$ and SiO$_2$. Between the substrate 29 and the glass substrate 38 with the transparent electrode 37, a homogeneously oriented biphenyl liquid crystal layer about 2 μm thick having a positive dielectric anisotropy is formed through the orientation processing layers 34 and 36. The writing light 39 enters this light valve from the side of the CdS photoconductive layer 31 in the form of two-dimensional optical image, while the projection light 40 enters it from the side of the liquid crystal layer 35. In the presence of the grating light mask 30, the writing light 39 is radiated periodically on the photoconductive layer 31, so that the resistance of the photoconductive layer 30 changes periodically. If a voltage is applied between the electrodes 28 and 37 under this condition, a periodic electric field is applied to the liquid crystal layer 35. The projection system used in this embodiment is schematically shown in FIG. 5.

The light emitted from the writing two-dimensional optical image source (visible light) 41 forms an image at the photoconductive layer of the light valve 43 through the writing lens 42. On the other hand, the light from the projection light source 44 is condensed at and reflected on the bar mirror 46 by the condenser lens 45, converted into parallel rays of light by the projection lens 47, and enters the light valve 43. Here, the light not diffracted is reflected again as parallel light, and blocked by condensation at the bar mirror 46 through the projection lens 47. The diffracted light, in contrast, forms an image on the screen 48 without being blocked by the bar mirror 46. The test in which an image was actually projected on the screen 48 showed that an image of superior quality the same as in the first embodiment is formed. As compared with the conventional reflection liquid crystal light valve of light scattering type, the light valve under consideration is high in contrast, gray scale or gradation, response, light utilization efficiency and image quality. In this embodiment, a screen bar having a structure of spatial period is disposed in front of the photoconductive layer as the means for forming a two-dimensional optical image having an intensity distribution with the spatial period on the photoconductive layer. In place of such an arrangement, a two-dimensional optical image having a light intensity distribution with a spatial period may also be used as a writing light source.

Next, another embodiment in which plural types of image, especially, color image are projected by use of a single liquid crystal valve will be explained. The color image projection is effected by input means for supplying red, green and blue image signals (R, G, B), signal separator means (if required), means for applying a voltage of spatial period having a spatial intensity distribution corresponding to each image signal, and means for color separation of each signal and projection of the same.

Embodiment 3

Figure 6A:
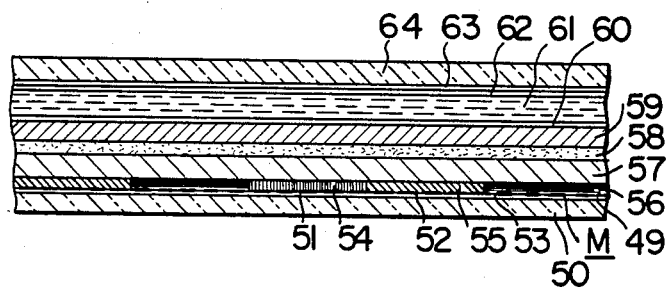
FIG. 6a is a diagram showing the configuration of the liquid crystal light valve according to a third embodiment of the system of the present invention.
Figure 6B:
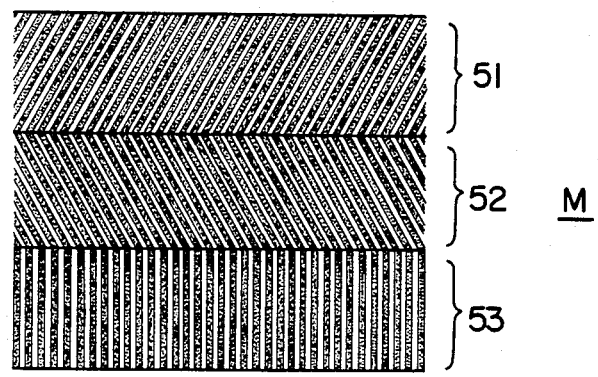
FIG. 6b is a schematic configuration diagram showing the essential parts of the projection system of FIG. 6a in an enlarged form.

The embodiment under consideration comprises a color picture tube giving a plurality of input image signal sources as input means, color filters for transmitting red, blue and green colors as means for separating each image signal, a light mask including three gratings arranged in order in different directions as means for forming plural types of diffraction gratings in the liquid crystal layer on the writing light side of the photoconductive layer, and as a means for separating the colors, a color Schlieren lever. The construction of the light valve according to this embodiment is shown in FIG. 6a. The light mask M so constructed as to have a plurality of sequentially arranged stripes in different directions and having a shape as schematically shown in FIG. 6b is attached to the glass substrate 50 having the electrode 49 on the writing light side. The light mask M is further covered with red, green and blue color filters 54, 55 and 56 on the regions 51, 52 and 53 respectively of the mask M. Furthermore, on this assembly, the photoconductive layer 57, the light absorbing layer 58, the reflector 59 and the orientation processing layer 60 are covered in that order, to form the substrate 50. The photoconductive layer 57, the light absorbing layer 58 and the reflector 59 are the same as those employed in Embodiment 2 above. The transparent electrode 63 and the orientation processing layer 62 are laid on the glass substrate 64 on the projection light side, between which and the substrate 50 is interposed the liquid crystal layer 61.

Figure 7:
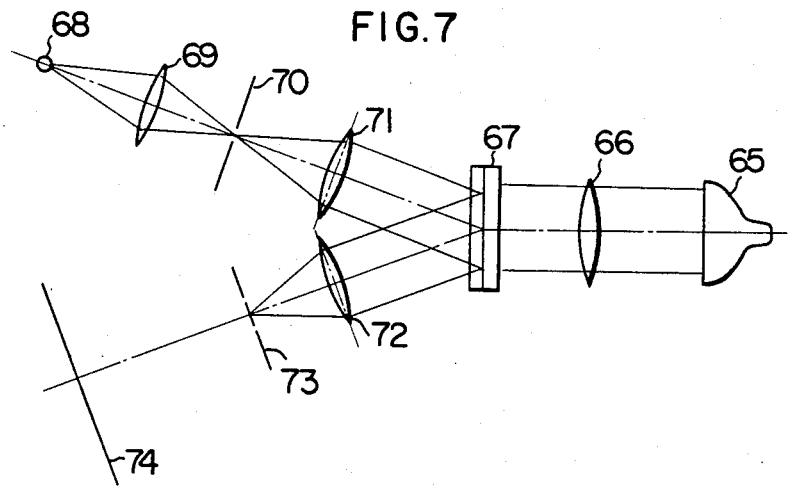
FIG. 7 is a schematic configuration diagram showing the projection system according to the third embodiment.
Figure 8:
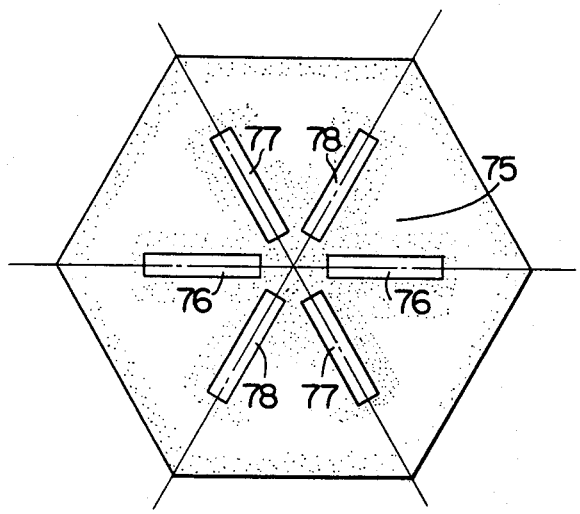
FIG. 8 shows schematically a configuration of the Schlieren stop included in the projection system of the third embodiment.

The projection light system used in the embodiment under consideration is schematically shown in FIG. 7. The color image formed on the color display tube 65 is formed also on the surface of the photoconductor of the light valve 67 by the writing lens 66. This image is color-separated by the color filters 54, 55 and 56. The electric fields corresponding to the intensity of the input image lights of red, green and blue in the image are applied adjacently to each other into the liquid crystal layer. In view of the provision of a photomask of grating of different directions before the color filters 54, 55 and 56, however, periodic electric fields of different directions for red, green and blue signals are applied in the liquid crystal. For the purpose of image projection, a reflection Schlieren optical system is used. The light emitted from the projection light source 68 is condensed at the pin hole 70 by the condenser lens 69. The light expanding after the pin hole 70 is converted into a substantially parallel light ray by the Schlieren lens 71 and enters the reflection light valve 67. The light reflected without being diffracted is blocked by the Schlieren stop 73 placed at the focal point of the projection lens 72. On the other hand, the light reflected by diffraction in three directions in response to the application of three different periodic electric fields to the liquid crystal layer according to the red, green and blue signals are not blocked by the Schlieren stop 73 but reach the screen 74 for image formation. The Schlieren stop 73 as shown in FIG. 8 is used. Light is blocked at the part designated by 75, at the center of which the non-diffraction light from the light valve 67 is condensed. Numerals 76, 77 and 78 show parts where light is transmitted, which comprise filters for selectively transmitting the wavelengths of red, green and blue respectively. The light diffracted in three directions in accordance with the red, green and blue signals pass the parts 76, 77 and 78 respectively to form images on the screen 74, thus projecting a color image on the screen 74. The number of picture elements of the color image is substantially determined by the width of the regions 51, 52 and 53 in FIG. 6. In the case where such a width is about several times the pitch of the striped light mask M, the quality of the color image poses no problems, resulting in superior color as compared with the color image for the light valve of polarization type. The other characteristics are substantially the same as those in the case of Embodiment 2 above.

As to the means for supplying plural types of input images, the means for forming plural types of diffraction gratings corresponding to the image signals and the means for projecting each image separately on the screen, various forms other than shown in the embodiment under consideration may be taken, and these other forms will be specifically explained with reference to following embodiments.

Embodiment 4

Figure 9:
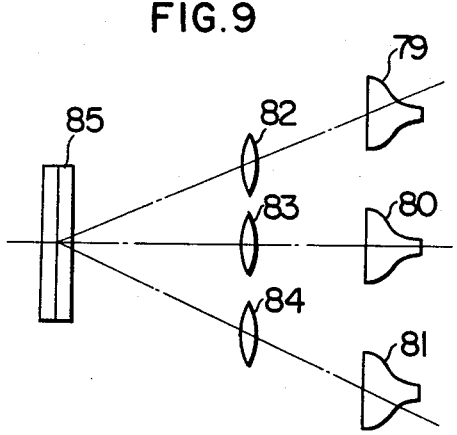
FIG. 9 schematically shows a configuration of a writing system of a fourth embodiment according to the system of the present invention.

Concerning a liquid crystal light valve of the two-dimensional optical image writing type, this embodiment shows an example of the means for supplying a plurality of input images, especially, image inputs of red, green and blue. As shown in FIG. 9, three types of monochrome picture tubes 79, 80 and 81 for forming images of red, green and blue are used. The images on the respective picture tubes are focussed on the light valve 85 through the writing lenses 82, 83 and 84 respectively. The construction of the light valve and the projection system is the same as that for the above Embodiment 3.

Embodiment 5

Figure 10:
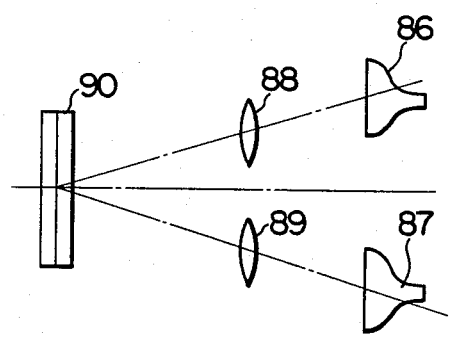
FIG. 10 is a diagram showing schematically a configuration of a writing system of a fifth embodiment of the system according to the present invention.

This embodiment is rather concerned to a writing system with a two-dimensional optical image, intermediate between embodiments 3 and 4. As shown in FIG. 10, there is used a monochrome picture tube 86 for emitting green and a penetration tube 87 for emitting red and blue. The image from the respective tubes is focussed on the light valve 90 through the writing lenses 88 and 89. The light valve and the projection system are constructed in the same way as in Embodiment 3 above.

Embodiment 6

Figure 11:
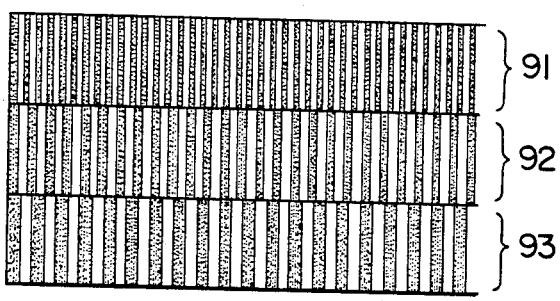
FIG. 11 is an enlarged configuration diagram showing a light mask included in the liquid crystal light valve according to a sixth embodiment of the system of the present invention.
Figure 12:
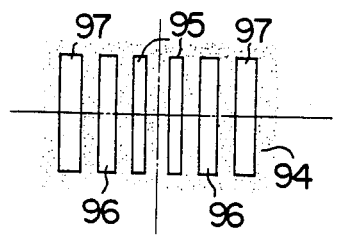
FIG. 12 is a diagram schematically showing a configuration of the Schlieren stop included in the projection system of the sixth embodiment.

This embodiment concerns a system for forming plural types of diffraction gratings of different pitches, as another example of the means for forming the plural diffraction gratings. As shown in FIG. 11, masks 91, 92 and 93 of different pitches are sequentially arranged in place of the light-blocking mask in FIG. 6b. At the same time, the Schlieren stop of the shape shown in FIG. 12 is used instead of that shown in FIG. 8. Numeral 94 shows a light blocking section. Filters for selectively passing red, green and blue colors are placed at portions designated by 95, 96 and 97 respectively. This system utilizes the principle that the diffraction angle of the light diffracted in the liquid crystal depends on the pitch of the diffraction grating.

Embodiment 7

Figure 13:
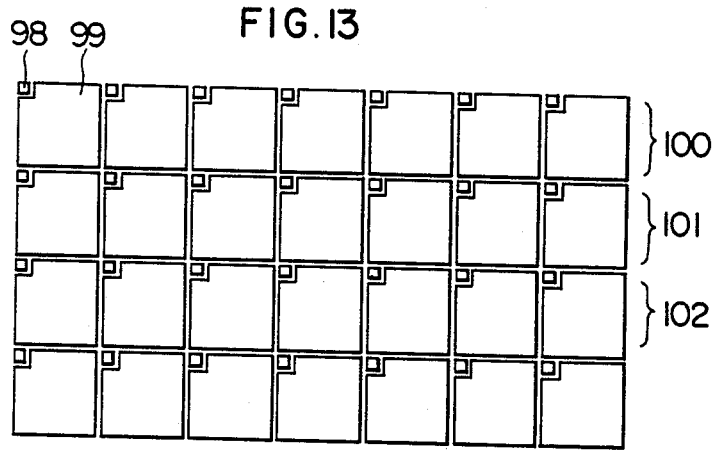
FIG. 13 shows a configuration of the picture element electrode substrate included in the light valve according to a seventh embodiment of the present invention.

This embodiment represents an example of the means for electrically supplying plural types of image signal. In FIG. 13, each picture element is comprised of a switching element 98 and a picture element electrodes 99 and forms a MOS array. Voltages corresponding to the image signals of red, green and blue are applied in order to the lines 100, 101 and 102, respectively. A transparent electrode in opposite side through the liquid crystal layer has the shape as shown in FIG. 6a. The liquid crystal cell is constructed in such a manner that the regions 51, 52 and 53 coincide with the lines 100, 101 and 102 respectively. A projection system of this embodiment is constructed substantially in the same way as in Embodiment 3. As the means for supplying the image signal electrically to the liquid crystal layer, a TFT matrix may alternatively be used.

Embodiment 8

Figure 14:
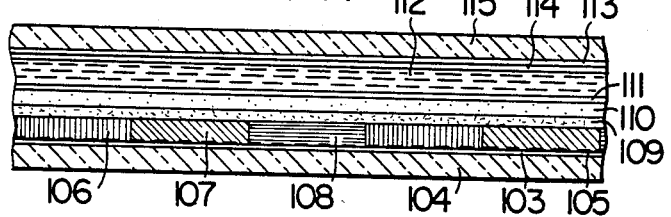
FIG. 14 is a diagram showing a configuration of the liquid crystal light valve according to an eighth embodiment of the system of the present invention.

Concerning a projection system of two-dimensional optical image writing type for plural colors, this embodiment employs photoconductive layers of different spectral sensitivity wavelengths arranged in order, as the means for forming diffraction gratings associated with the respective image signals. The construction of this embodiment is shown schematically in FIG. 14. A substrate 104 to which a transparent electrode 103 is attached is provided with a light-blocking mask 105 mounted thereto of the shape as shown in FIG. 6b. On this assembly are laid photoconductive layers 106, 107 and 108 having optical sensitivities to red, green and blue respectively so as to face the regions 51, 52 and 53 of FIG. 6b respectively. The resulting assembly is further covered with a light-absorbing layer 109, a light-reflecting layer 110 and an orientation processing layer 111. Another substrate in opposite side is constituted by a glass substrate 115 to which a transparent electrode 113 and an orientation processing layer 114 are attached. A liquid crystal layer 112 is interposed between the substrates 104 and 115. An image projection system is the same as employed in Embodiment 3.

Embodiment 9

Figure 15:
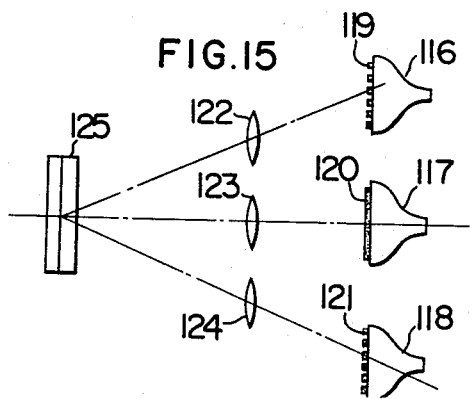
FIG. 15 is a diagram schematically showing a writing system of a ninth embodiment of the system according to the present invention.

In this embodiment as shown in FIG. 15, there are employed three monochrome picture tubes 116, 117 and 118 for forming the signal images of red, green and blue, as the writing light sources. In front of the picture tubes, grating masks 119, 120 and 121 having different directions are arranged, so that an image is focussed on a surface of a photoconductive layer of a light valve 125 through writing lenses 122, 123 and 124. According to this embodiment, images having three different periodic intensity distributions are directly focussed on the light valve 125, and therefore it is not necessary to provide any color-separator means or photomask on the light valve, to realize a simple construction. The Schlieren projection system is constructed quite in the same way as that in FIG. 7.

As specifically described with reference to the above-mentioned embodiments, the feature of the light valve projection image display apparatus using a liquid crystal according to the present invention is that a light valve so constructed that an electric field with a spatial period corresponding to the input image signal is applied to the liquid crystal layer is disposed in the Schlieren optical system. By this construction, it is capable of producing a projection image high in brightness and resolution and superior in half tone display, response characteristics and color image quality. Further, this invention is applicable both to the transmission type and reflection type light valve projection image display apparatus depending on image reproduction requirements. Especially it is possible to project a color image easily with a simple construction including only a single light valve, thereby leading to a very high practical utility in various industrial applications.

What is claimed is:

1. A liquid crystal light valve projection color image display apparatus comprising:

an electro-optic element comprising a pair of substrates; a nematic liquid crystal layer interposed between said substrates and having optic anisotropy; electric field applying means for applying to said nematic liquid crystal layer a patterned electric field which has a plurality of different striped electric field patterns each associated with a respective different region of said liquid crystal layer to form a plurality of different diffraction gratings, each having a different diffraction pattern; in said regions of said liquid crystal layer, each of said different diffraction gratings having a respective fixed spatial diffraction period; means for forming from at least one applied image signal a plurality of color separated input image signals in said electro-optic element each said color separated image signal being formed in a different region of said electro-optic element containing a respective diffraction grating, said electro-optic element forming a plurality of separate diffracted color images from said applied input image by means of said plurality of different diffraction gratings;

means for applying at least one input image signal to said electro-optic element; and, a Schlieren optical system for projecting said separate color images formed in said electro-optic element onto a projection surface.

2. An image display apparatus according to claim 1, wherein said plurality of different diffraction gratings are arranged, respectively, in different directions relative to each other.

3. An image display apparatus according to claim 1, wherein said plurality of different diffraction gratings are arranged, respectively, to have a different and fixed spatial period relative to each other.

4. An image display apparatus according to claim 1, wherein said plurality of different diffraction gratings are arranged in sequence.

5. An image display apparatus according to claim 1, wherein said electric field applying means includes respective electrodes on the inside surfaces of said substrates holding said liquid crystal layer, one of said electrodes having a plurality of different stripe configurations arranged in sequence which are different in direction and pitch from one another.

6. An image display apparatus according to claim 1, wherein said electric field applying means comprises a photoconductive layer disposed electrically in series with said liquid crystal layer, and a two-dimensional optical image having a plurality of spatial period intensity distributions is focussed on said photoconductive layer.

7. An image display apparatus according to claim 1, further comprising a light-blocking mask having a plurality of different stripe configurations disposed on a writing input light side of said photoconductive layer.

8. An image display apparatus according to claim 1, wherein said two-dimensional optical image is focussed on said photoconductive layer by a writing light source including a plurality of two-dimensional optical images having spatially periodic light intensity distributions different in pitch and direction.

9. An image display apparatus according to claim 1, wherein said electro-optic element further comprises a photoconductive layer provided on an image receiving side of said electro-optic element, a light mask having a striped pattern for forming said plurality of different diffraction gratings provided on an image receiving side of said photoconductive layer, and a plurality of color filters provided between said photoconductive layer and light mask, each said color filter covering a respective portion of said striped pattern which forms one of said diffraction gratings.

10. An image display apparatus according to claim 9 wherein said electro-optic element further comprises a light absorbing layer provided on a side of said photoconductive layer opposite to said image receiving side and a light reflecting layer provided between said light absorbing layer and said liquid crystal layer.

11. An image display apparatus according to claim 1, wherein said means for applying applies at least two color separated image signals to said electro-optic element.

12. An image display apparatus according to claim 1, wherein said means for applying applies at least three color separated image signals to said electro-optic element.

13. An image display apparatus according to claim 1, wherein said electro-optic element further comprises a photo conductive layer provided on an image receiving side of said electro-optic element, a light mask having a striped pattern for forming said plurality of different diffraction gratings provided on an image receiving side of said photoconductive layer, said photoconductive layer having a plruality of regions of different spectral sensitivity each covering a respective portion of said striped pattern which forms one of said diffraction gratings.

14. An image display apparatus according to claim 13 wherein said electro-optic element further comprises a light absorbing layer provided on a side of said photoconductive layer opposite to said image receiving side and a light reflecting layer provided between said light absorbing layer and said liquid crystal layer.

15. An image display apparatus according to claim 1, wherein said means for applying applies a plurality of color separated image signals to said electro-optic element through respective diffraction grating masks.

16. A liquid crystal light valve projection image display apparatus comprising:

an electro-optic element including a pair of substrates, a nematic liquid crystal layer and a photoconductive layer arranged in series and interposed between said substrates, said nematic liquid crystal layer having a dielectric and optic anisotropy, a light blocking mask having striped openings at a fixed spatial period disposed on an input light side of said photoconductive layer, a first means including said mask and photoconductive layer for supplying a first electric field in a two-dimensional voltage pattern having a fixed striped spatial period to said liquid crystal layer to produce first areas of said layer where the molecules thereof are reoriented away from a predetermined molecular orientation by a voltage potential of said electric field and second areas of said layer not exposed to a voltage potential of said electric field where said molecules continue to have said predetermined molecular orientation, thus forming a phase diffraction grating in said liquid crystal layer, and second means for supplying said liquid crystal layer with a second electric field having a spatially distributed intensity corresponding to an electrical or optical input image signal representing a two-dimensional image;

image supply means for electrically or optically supplying said input image signal to said electro-optic element; and, a Schlieren optical system for projecting image information formed in said liquid crystal layer as said phase diffraction grating on a screen by using light diffracted from said phase diffraction grating.

* * * * *